US009746711B2

(12) United States Patent
Lee et al.

(10) Patent No.: US 9,746,711 B2
(45) Date of Patent: Aug. 29, 2017

(54) PIXEL STRUCTURE AND LIQUID-CRYSTAL DISPLAY

(71) Applicant: InnoLux Corporation, Miao-Li County (TW)

(72) Inventors: Hsin-Yu Lee, Miao-Li County (TW); Ching-Che Yang, Miao-Li County (TW); Chen-Kuan Kao, Miao-Li County (TW); Wen-Jyh Sah, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 2 days.

(21) Appl. No.: 14/845,074

(22) Filed: Sep. 3, 2015

(65) Prior Publication Data
US 2016/0077393 A1  Mar. 17, 2016

(30) Foreign Application Priority Data

Sep. 15, 2014  (TW) .............................. 103131722 A

(51) Int. Cl.
G02F 1/1337  (2006.01)
G02F 1/1362  (2006.01)
(Continued)

(52) U.S. Cl.
CPC ...... *G02F 1/133707* (2013.01); *G02F 1/1337* (2013.01); *G02F 1/133345* (2013.01);
(Continued)

(58) Field of Classification Search
CPC ............. G02F 1/1337; G02F 1/133345; G02F 1/134226; G02F 1/136286; G02F 1/133707
See application file for complete search history.

(56) References Cited

U.S. PATENT DOCUMENTS 6,100,950 A * 8/2000 Tanaka .............. G02F 1/134336
349/143
9,097,949 B2 * 8/2015 Chen .................. G02F 1/133345
(Continued)

FOREIGN PATENT DOCUMENTS

CN       102402039     4/2012
JP       2005-10480    1/2005

OTHER PUBLICATIONS

Chinese language office action dated Nov. 3, 2015, issued in application No. TW 103131722.

*Primary Examiner* — Dung Nguyen
(74) *Attorney, Agent, or Firm* — McClure, Qualey & Rodack, LLP

(57) ABSTRACT

A pixel structure is provided. The pixel structure includes a substrate and an insulating layer on the substrate. The insulating layer includes a plane region. An electrode pattern is disposed on the insulating layer and located on the plane region. The electrode pattern includes a bottom layer and a plurality of protrusions connected to the bottom layer. The protrusions protrude from the top surface of the bottom layer towards a direction away from the substrate. The bottom layer covers the plane region. A plurality of slits are formed between the protrusions so as to expose portions of the bottom layer. A liquid-crystal display having the pixel structure is also provided.

8 Claims, 13 Drawing Sheets

(51) Int. Cl.
*G02F 1/1333* (2006.01)
*G02F 1/137* (2006.01)

(52) U.S. Cl.
CPC .............. *G02F 1/136286* (2013.01); *G02F 2001/13706* (2013.01); *G02F 2001/13712* (2013.01); *G02F 2001/133742* (2013.01); *G02F 2001/133757* (2013.01)

(56) References Cited

U.S. PATENT DOCUMENTS

| | | | |
|---|---|---|---|
| 2010/0053490 A1* | 3/2010 | Kang | G02F 1/133371 349/48 |
| 2013/0154911 A1* | 6/2013 | Chen | G02F 1/134336 349/144 |
| 2013/0155363 A1 | 6/2013 | Lee et al. | |

* cited by examiner

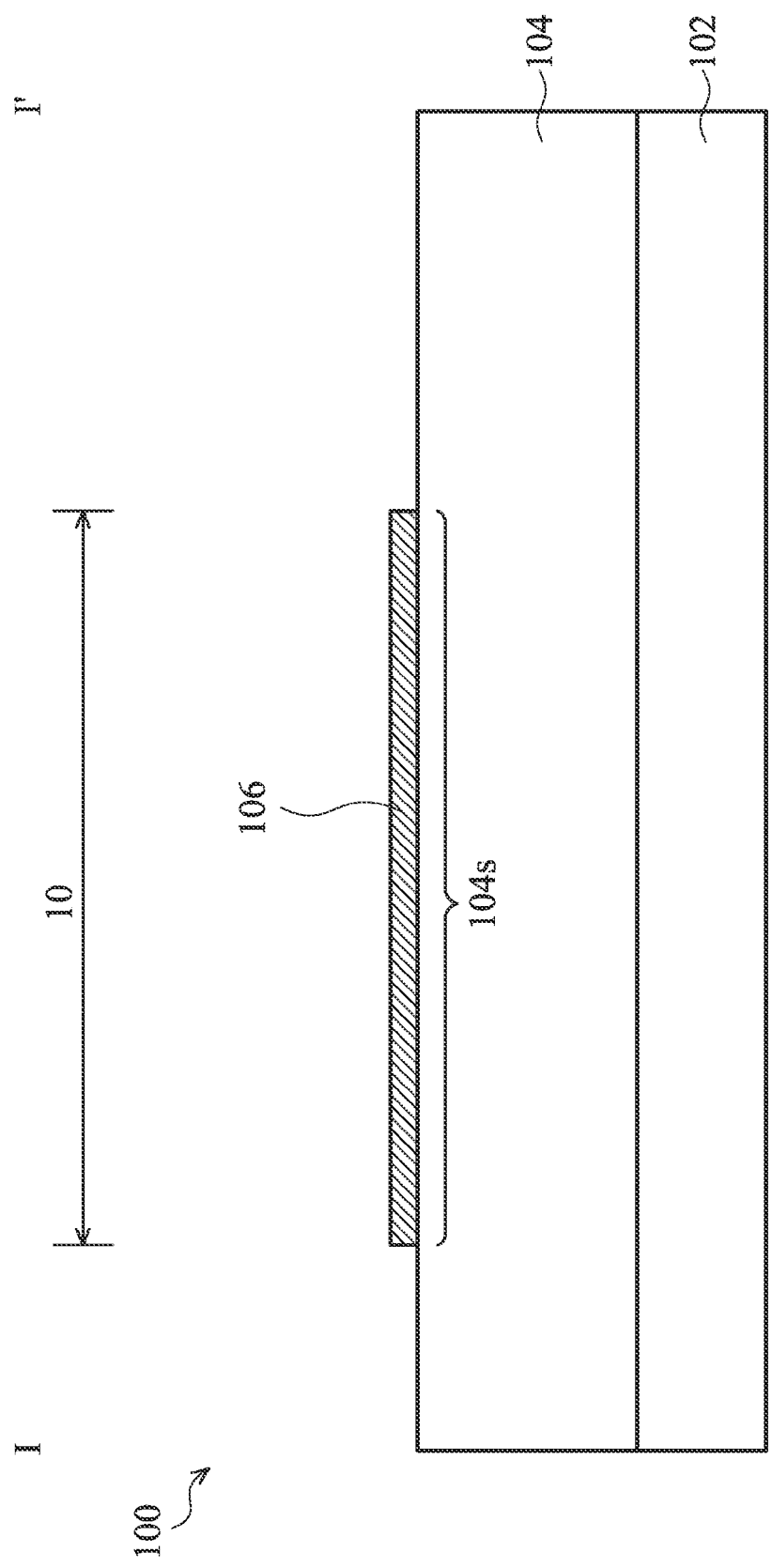

PIXEL STRUCTURE AND LIQUID-CRYSTAL DISPLAY

CROSS REFERENCE TO RELATED APPLICATIONS

This application claims priority of Taiwan Patent Application No. 103131722, filed on Sep. 15, 2014 and entitled "Pixel structure and liquid-crystal display", the entirety of which is incorporated by reference herein.

BACKGROUND

Field of the Disclosure

The present disclosure relates to a display, and in particular it relates to a pixel structure and a liquid-crystal display used in vertical alignment type display.

Description of the Related Art

Liquid-crystal displays are widely used in personal computers, personal digital assistants (PDA), mobile phones, televisions, and so on since they have many advantages: they are lightweight, have low power consumption, and emit no harmful radiation.

According to the operating mode of liquid crystals, liquid-crystal displays can be classified into phase change type, twisted nematic (TN) type, horizontal electric field type (IPS or FFS), and vertical alignment (VA) type. The TN type has excellent transmission properties, but has a narrow viewing angle. Therefore, the VA type and IPS/FFS type have become important technologies due to the wide viewing angle they provide.

The VA type can be further classified into multi-domain vertical alignment (MVA) type, enhanced vertical alignment (EVA) type, patterned vertical alignment (PVA) type, and polymer-stabilized vertical alignment (PSVA) type. Because the PSVA type is a non-contact type of alignment process, and it is less affected by issues (such as static electricity, particle contamination, etc.) caused by the contact type alignment process (such as a friction alignment process), it has become a mainstream technology. The PSVA technology is still not entirely satisfactory in all respects, however, with issues involving contrast remaining problematic, for example. Accordingly, there is a need for further improvements to be made in the art.

BRIEF SUMMARY

The disclosure provides a display. The display comprises a pixel structure including a substrate. The pixel structure also includes an insulating layer on the substrate. The insulating layer includes a plane region. The pixel structure also includes an electrode pattern disposed on the insulating layer. The electrode pattern is located on the plane region. The electrode pattern includes a bottom layer and a plurality of protrusions connected to the bottom layer. The protrusions protrude from the top surface of the bottom layer towards a direction away from the substrate. The bottom layer covers the plane region, and a plurality of slits are formed between the protrusions so as to expose portions of the bottom layer.

The disclosure also provides a liquid-crystal display. The liquid-crystal display includes a first substrate and a second substrate disposed opposite to the first substrate. The liquid-crystal display also includes an insulating layer on the substrate. The insulating layer includes a plurality of plane regions arranged as an array. The liquid-crystal display also includes a first electrode layer on the insulating layer. The first electrode layer includes a plurality of electrode patterns, and the electrode patterns are respectively disposed in the plurality of plane regions. Each one of the electrode patterns includes a bottom layer and a plurality of protrusions on the bottom layer. The protrusions protrude from the bottom layer towards a direction away from the substrate. The bottom layer covers the plane region, and a plurality of slits are formed between the protrusions so as to expose portions of the bottom layer. The liquid-crystal display also includes a second electrode layer on the second substrate. The liquid-crystal display also includes a liquid-crystal layer between the first electrode layer and the second electrode layer.

A detailed description is given in the following embodiments with reference to the accompanying drawings.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 3A-3H show cross-sectional views of various stages of forming a pixel structure in accordance with one embodiment of the disclosure;

DETAILED DESCRIPTION

Figure 1:
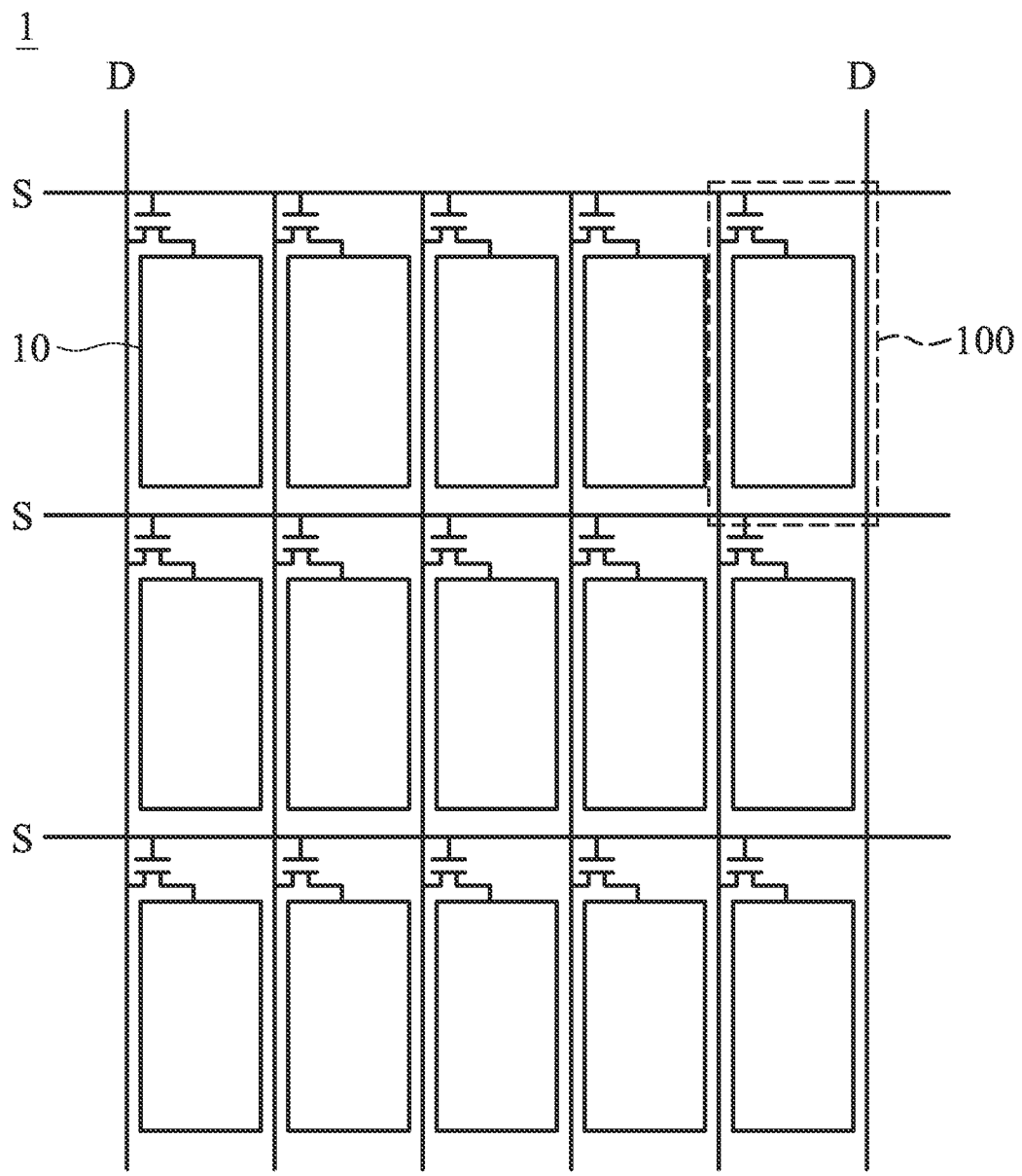
FIG. 1 shows a top view of a display device in accordance with one embodiment.

The present disclosure is understood from the following detailed description when read with the accompanying figures. It should be noted that, in accordance with the standard practice in the industry, various features are not drawn to scale. In fact, the relative dimensions of the various features may be arbitrarily increased or reduced for clarity of discussion. In the figures and the specification of the present disclosure, the same reference numerals and/or letters refer to the same components.

Referring to FIG. 1, it shows a top view of a display device 1 in accordance with one embodiment. The display device 1 includes the pixel structures 100 which are defined by the data lines D and the scan lines S. A plane region 10 is disposed in and corresponds to each one of the pixel structures 100. More specifically, each plane region 10 is substantially the light-emitting region of each pixel.

Figure 2A:
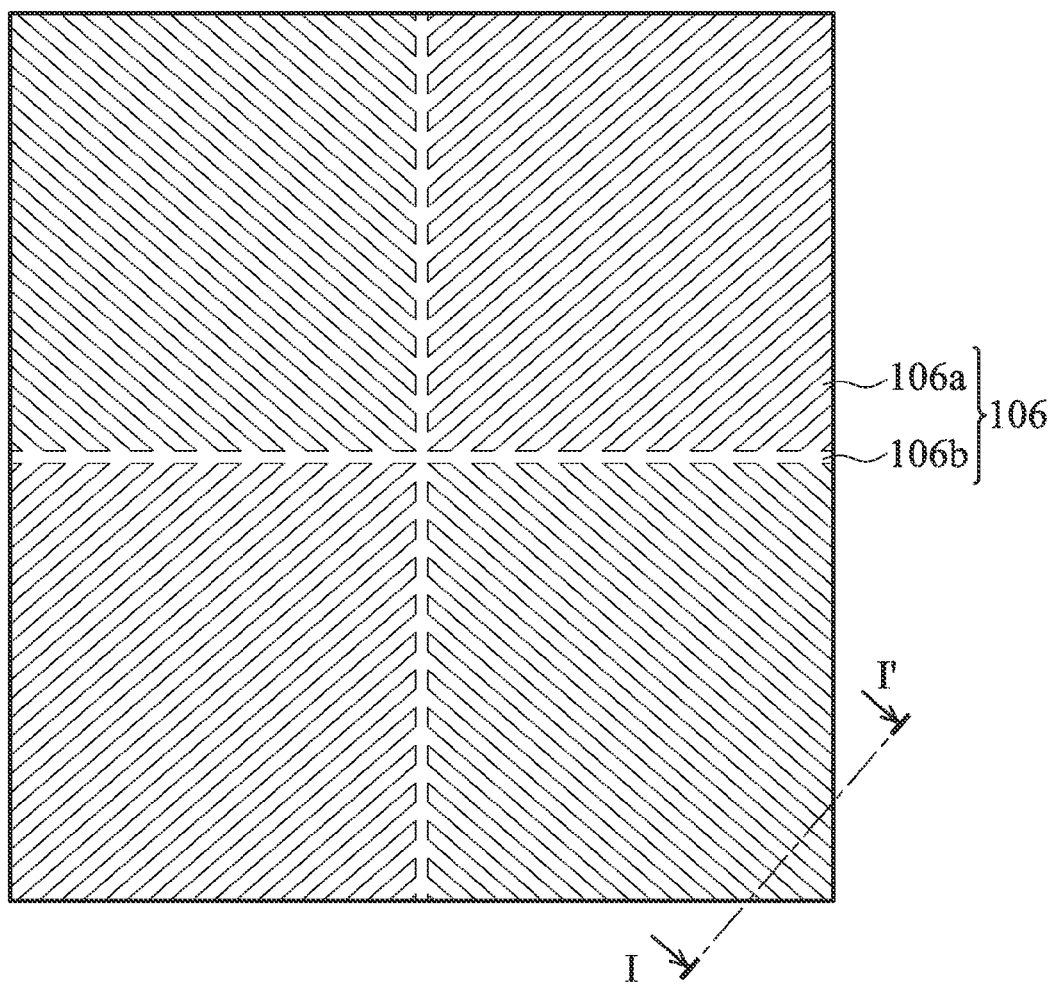
FIGS. 2A and 2B respectively show the top view and the three-dimensional view of the plane region illustrated in FIG. 1.
Figure 2B:
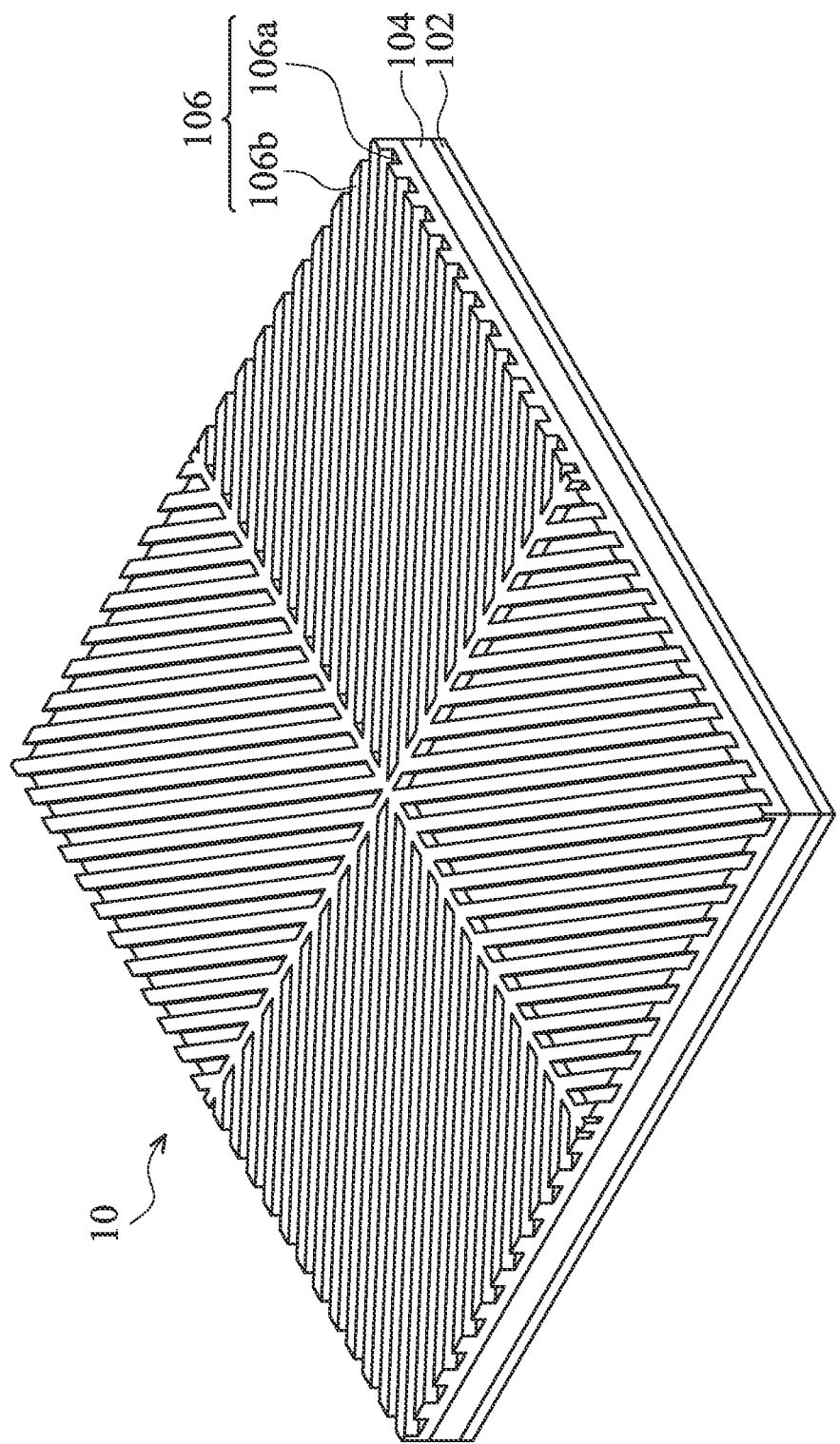

FIGS. 2A and 2B respectively show the top view and the three-dimensional view of the plane region 10 illustrated in FIG. 1. The pixel structure 100 sequentially includes a substrate 102, an insulating layer 104, and an electrode pattern 106 from bottom to top. The electrode pattern 106 includes a bottom layer 106a and a plurality of protrusions 106b disposed on the bottom layer 106a.

As shown in FIG. 2A, the protrusions 106b are spaced apart from each other with a plurality of slits disposed therebetween. It should be understood that the pattern of the protrusions 106b illustrated in FIG. 2A is merely for the purpose of description, and is not intended to be limiting. In other embodiments of the present disclosure, the protrusions 106b may include other different patterns. As shown in FIG.

2B, the bottom layer 106a and the protrusions 106b form a regularly arranged textured structure.

Figure 3A:
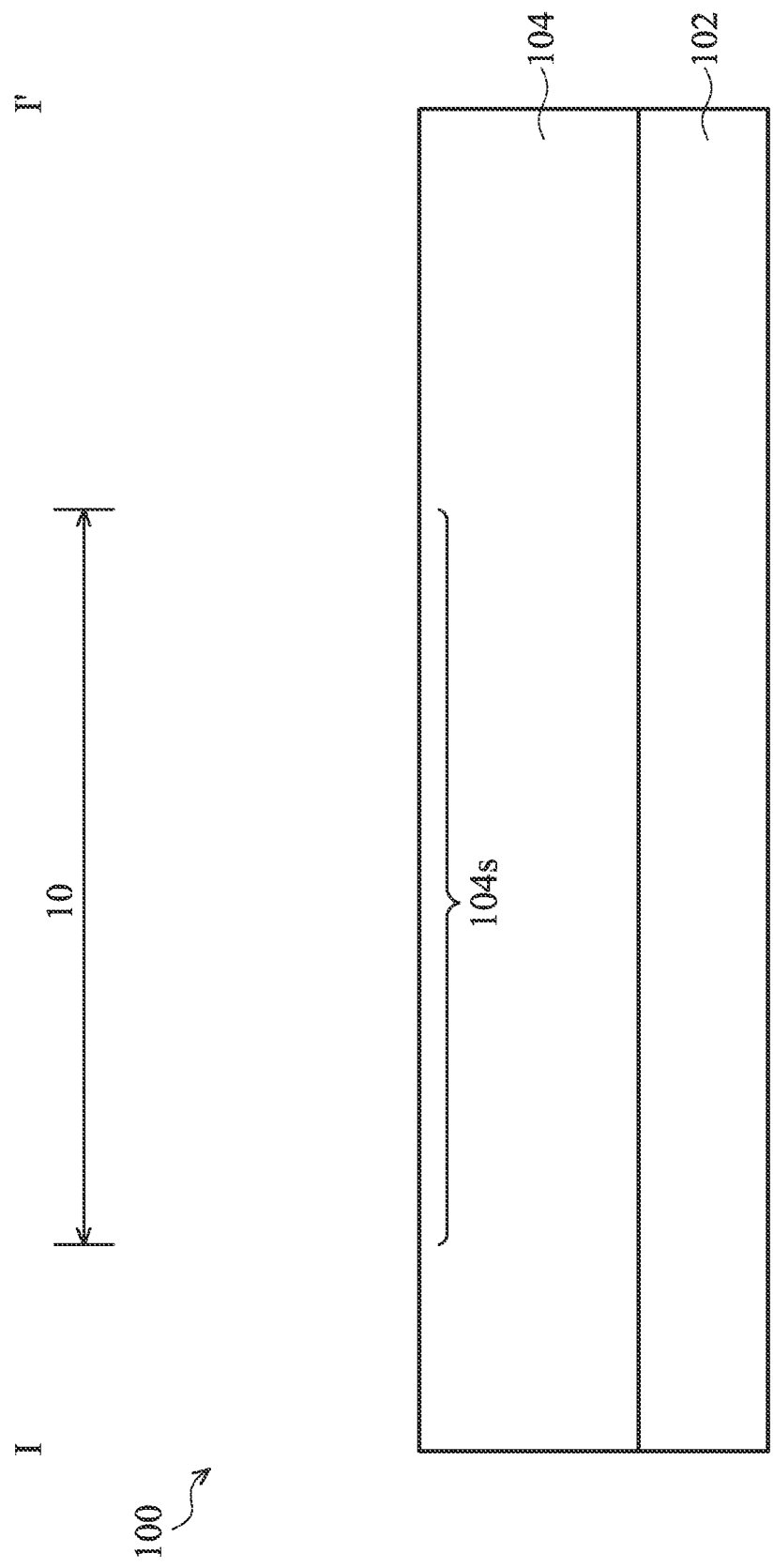
Figure 3B:
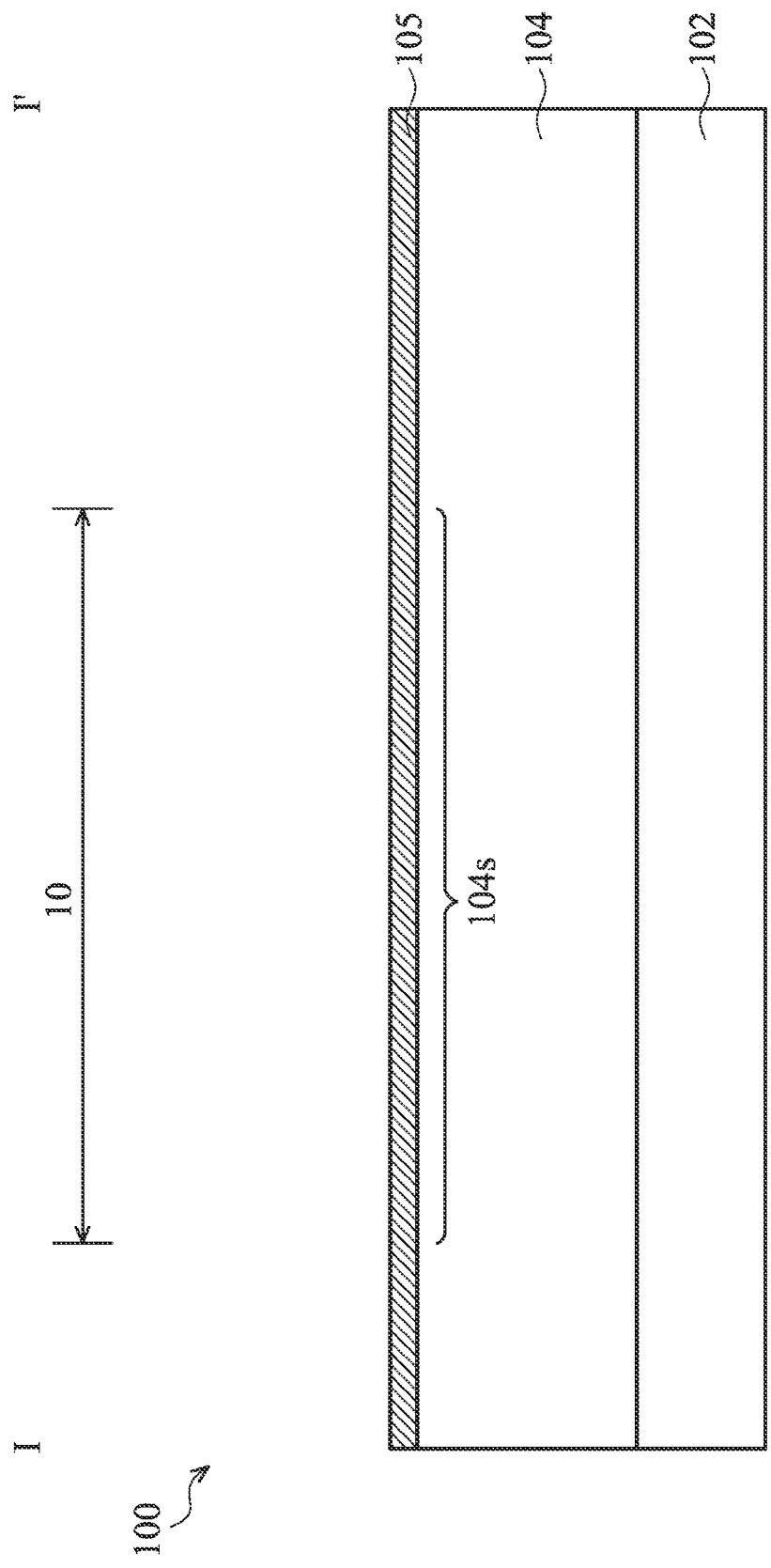
Figure 3C:
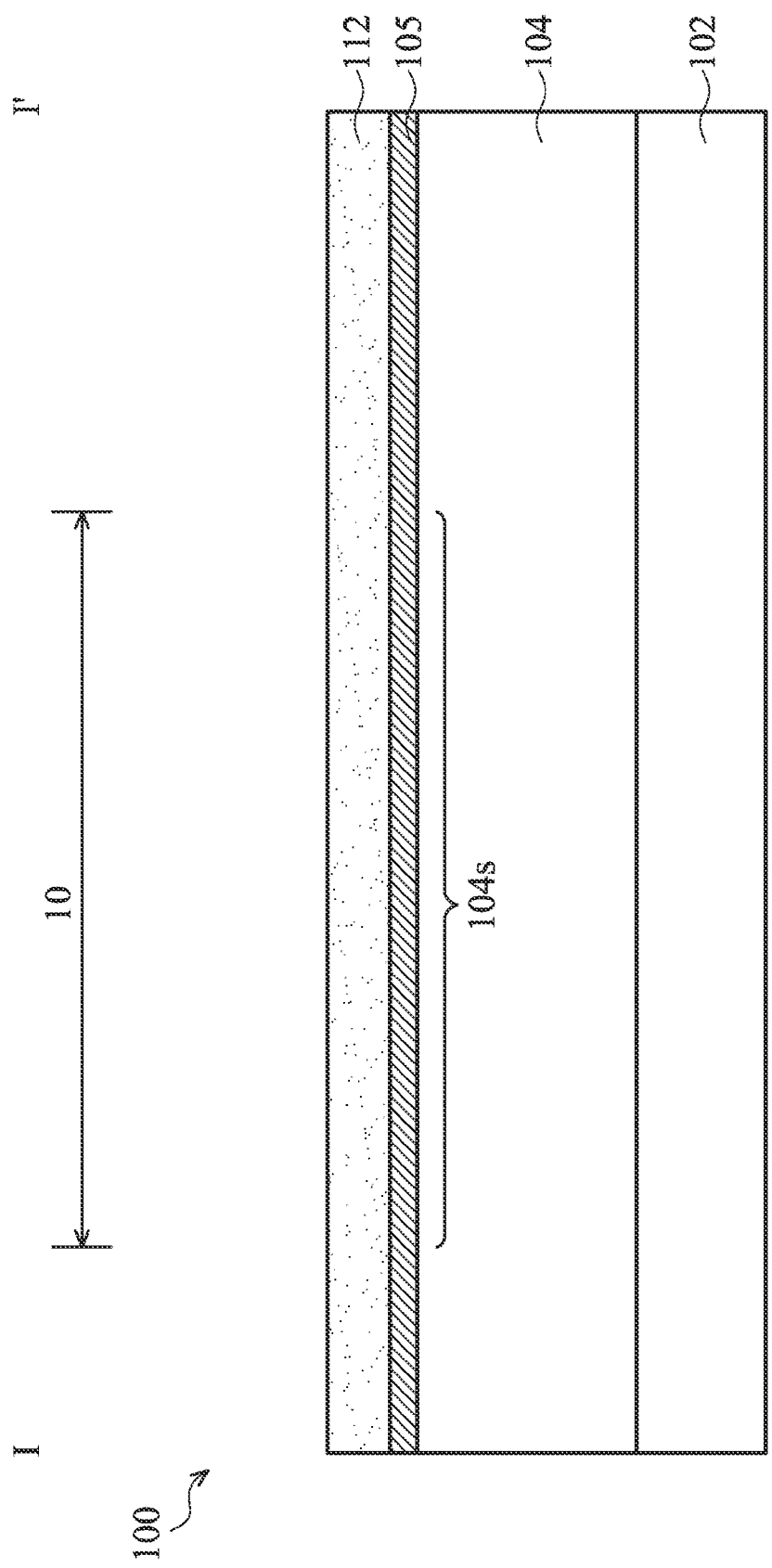
Figure 3D:
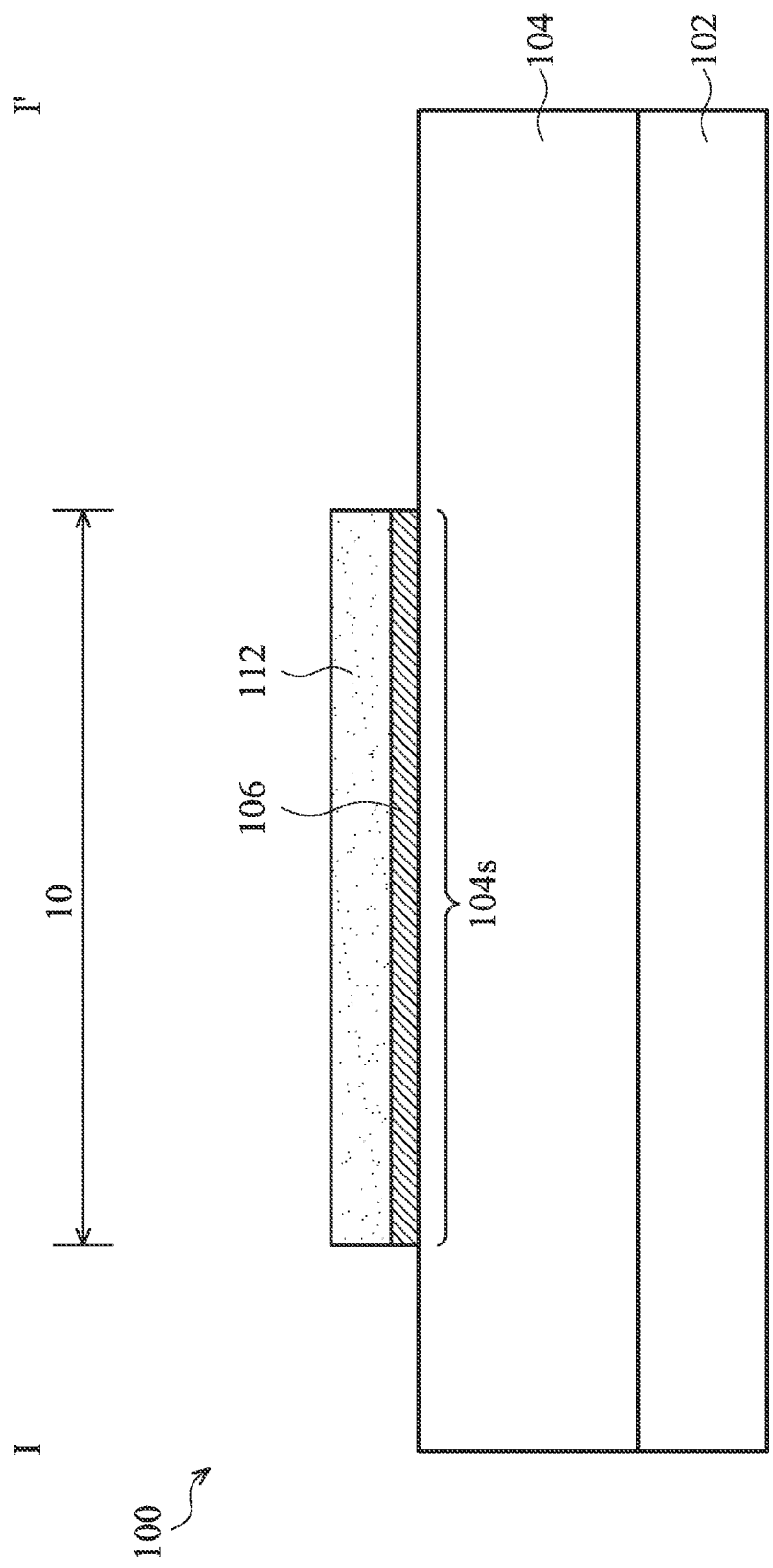
Figure 3F:
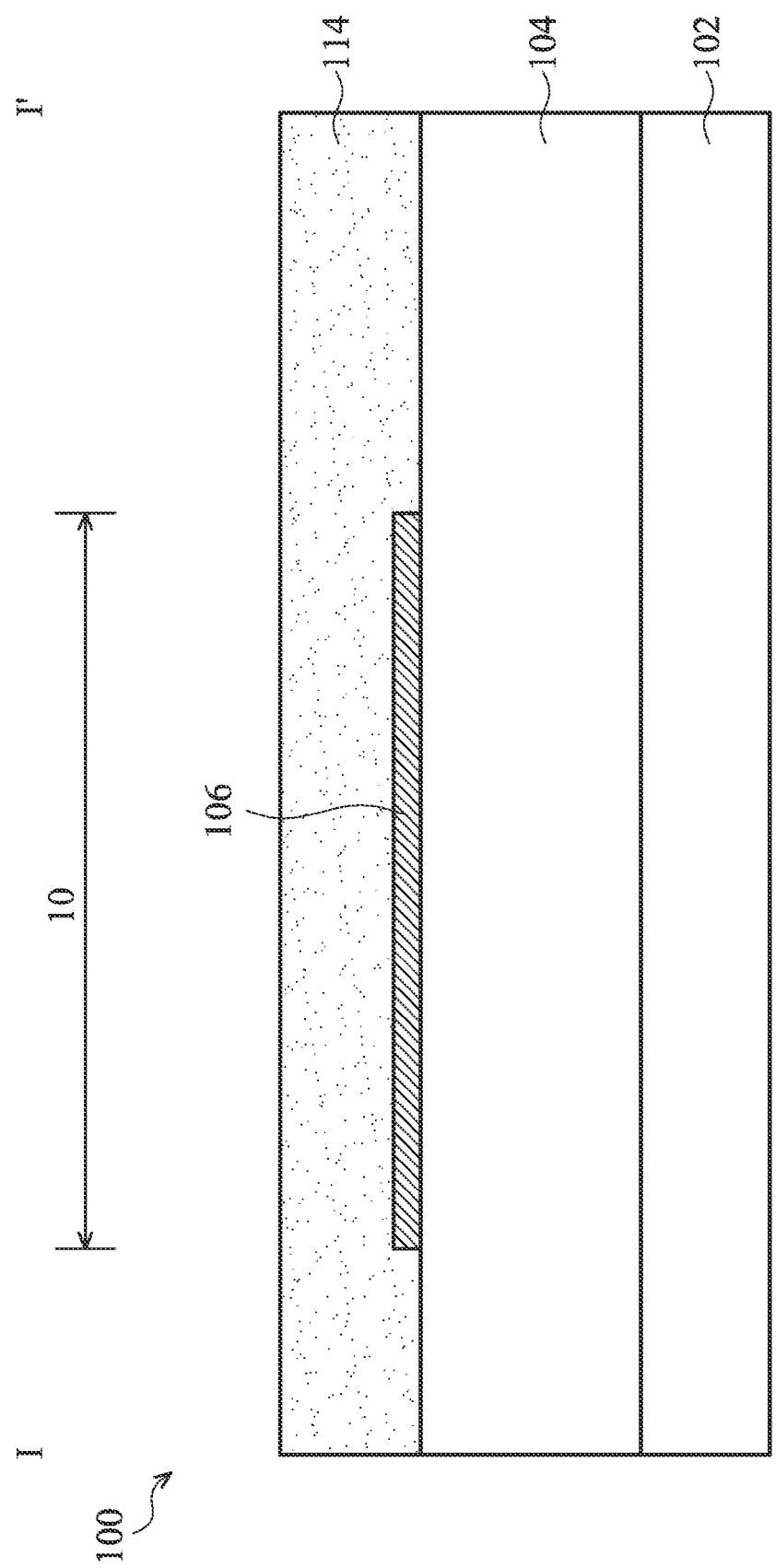
Figure 3G:
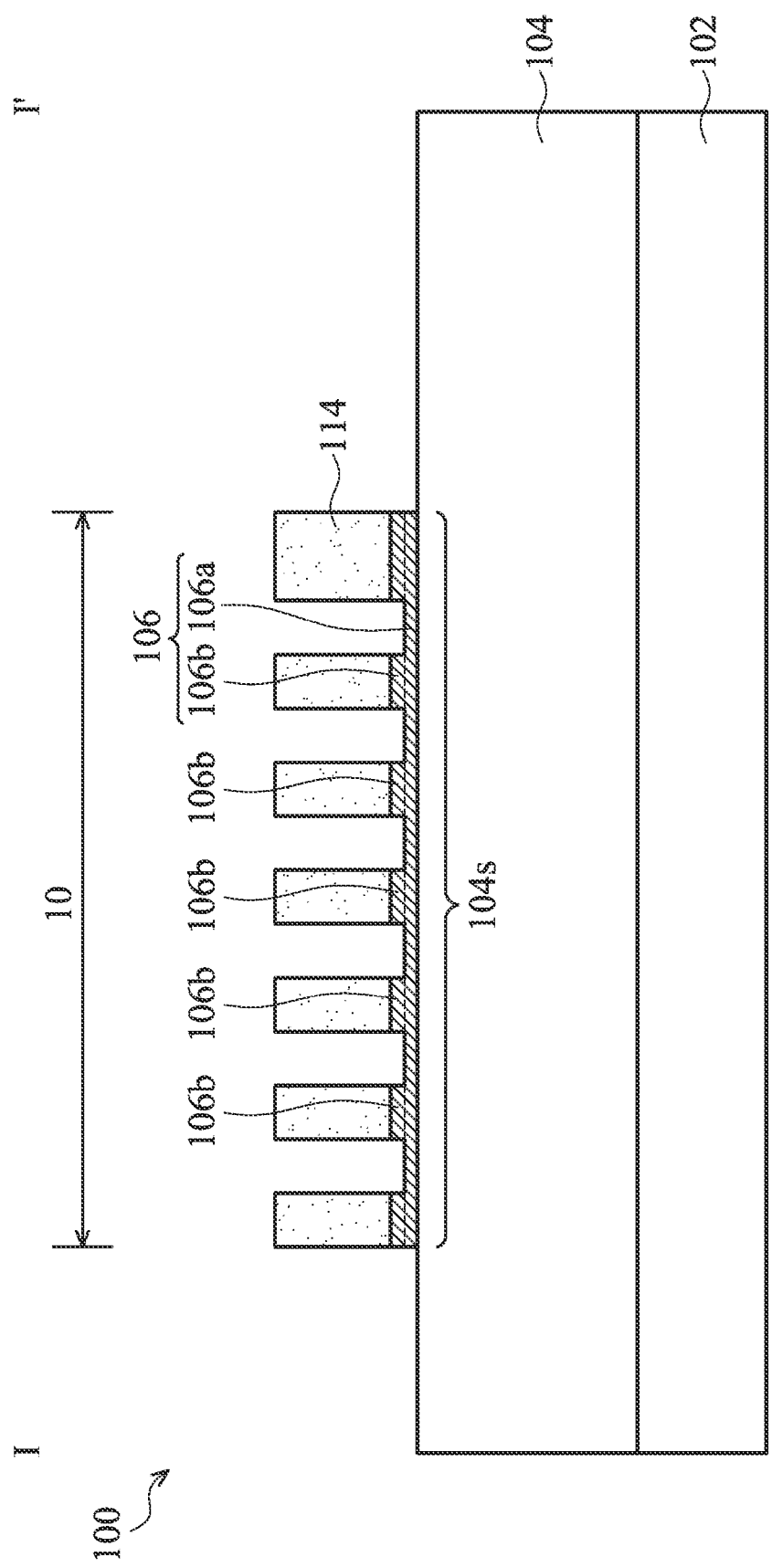
Figure 3H:
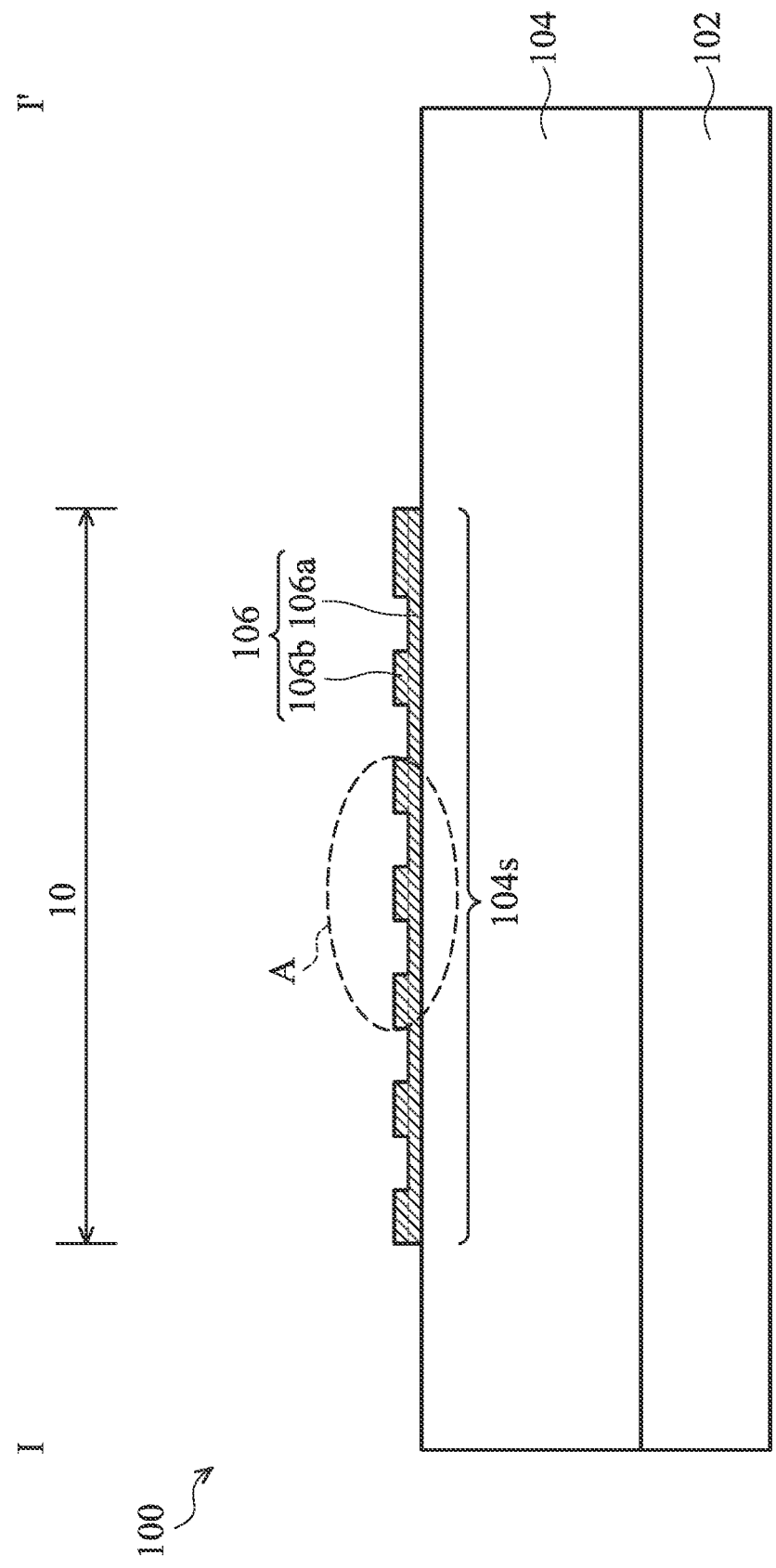

FIG. 3H shows a cross-sectional view of the pixel structure 100 in accordance with one embodiment. FIG. 3H is the cross-sectional view as taken along line I-I' of FIG. 2A. The pixel structure 100 sequentially includes the first substrate 102, the insulating layer 104 on the first substrate 102, and the electrode pattern 106 on the insulating layer 104.

The insulating layer 104 may include a stack of multiple dielectric layers. For the sake of clarity, only a single planar layer is shown. In this embodiment, the insulating layer 104 includes a plane region 10 and a planar surface 104s corresponding to the plane region 10. It should be understood that the term "planar surface" means substantially planar, in other words, it means a non-patterned surface despite that the surface roughness during the formation of the film and the topography of the underlying layers may be present.

The electrode pattern 106 is on the planar surface 104s of the insulating layer 104 corresponding to the plane region 10. In the present disclosure, the electrode pattern 106 includes a bottom layer 106a and a plurality of protrusions 106b spaced apart from each other disposed on the bottom layer 106a. As shown in FIG. 3H, the bottom layer 106a is the portion of the electrode pattern 106 under the dotted line, and the protrusions 106b are the portion of the electrode pattern 106 above the dotted line. The protrusions 106b of the electrode pattern 106 protrude from the bottom layer 106a along a direction substantially perpendicular to the planar surface 104s.

The bottom layer 106a of the electrode pattern 106 completely covers the planar surface 104s of the insulating layer 104, so that the bottom layer 106a and the protrusions 106b form a regularly arranged textured structure.

Figure 4:
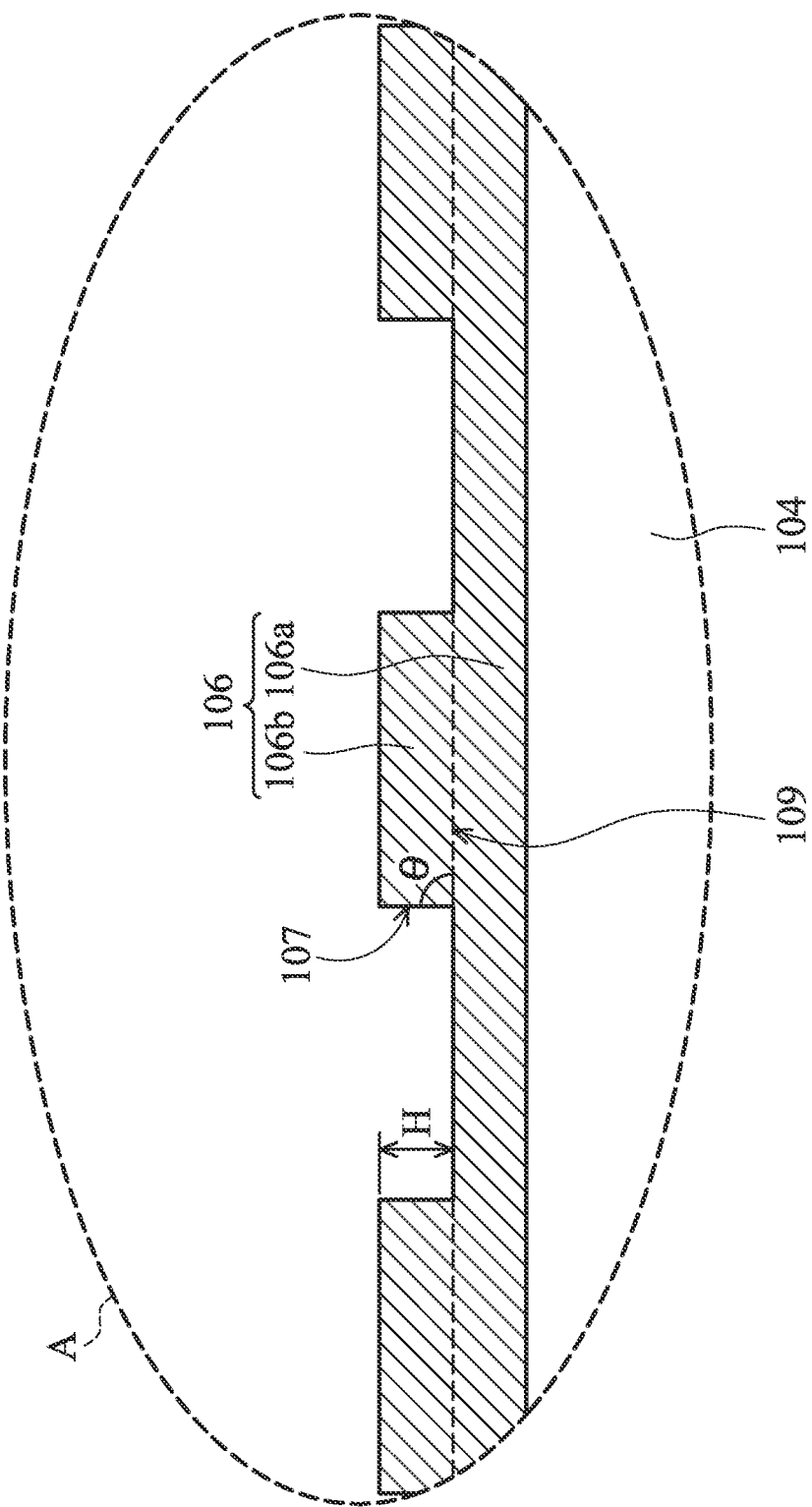
FIG. 4 shows an enlarged cross-sectional view of the area A of FIG. 3H.

FIG. 4 shows an enlarged cross-sectional view of the area A of FIG. 3H. In the insulating layer 104 corresponding to the plane region 10, a top surface 109 of the bottom layer 106a between the separated protrusions 106b are exposed. The protrusions 106b have a height H, and the height H is in a range of 50-200 nm, preferably. In one embodiment, the height H is in a range of 50-150 nm. In another embodiment, the height H is 100 nm. Furthermore, each protrusion 106b has sidewalls 107. The sidewalls 107 of the protrusion 106b and the top surfaces 109 of the bottom layer 106a have an included angle θ, and the included angle θ is preferably in a range of 60-90 degrees. In this embodiment, the included angle θ is approximately 90 degrees (i.e., the protrusion 106b is perpendicular to the bottom layer 106a) in order to produce a horizontal electric field vector with appropriate strength.

In accordance with this embodiment, because the electrode pattern 106 includes the bottom layer 106a completely covering the plane region 10, a vertical electric field with appropriate strength and perpendicular to the planar surface 104s is produced in the pixel structure 100. The pixel structure 100 may be utilized in a PSVA type liquid-crystal display to help control the tilt of the liquid-crystal molecules, thereby reducing the reaction time of the liquid-crystal display and enhancing the brightness of the liquid-crystal display. Furthermore, because the electrode pattern 106 includes the separated protrusions 106b, a horizontal electric field vector parallel to the planar surface 104s is produced. During the alignment of the liquid-crystal molecules, the horizontal electric field vector can effectively control the liquid-crystal molecules arranged along a pre-determined pre-tilt angle in the direction parallel to the planar surface 104s. In the pixel structure 100 of this embodiment, the electrode pattern 106 can produce a vertical electric field vector with appropriate strength and a horizontal electric field vector with appropriate strength. Therefore, the reaction time of the resulting liquid-crystal display can be reduced, the brightness of the resulting liquid-crystal display can be enhanced, and the direction of arrangement of the liquid-crystal molecules can be effectively controlled.

FIGS. 3A-3H show cross-sectional views of various stages of forming the pixel structure 100 in accordance with one embodiment of the disclosure.

Referring to FIG. 3A, the insulating layer 104 is formed on the first substrate 102. The material of the first substrate 102 may include glass, quartz, organic polymer film, other applicable materials, or a combination thereof.

The insulating layer 104 includes a stack of multiple dielectric layers, and metallization structures (such as scan line and date line) are further formed between the insulating layer 104 and the first substrate 102. For the sake of clarity, only a single planar layer is shown. In this embodiment, the insulating layer 104 includes a plane region 10 in each pixel structure, and the insulating layer 104 has a planar or a non-patterned surface 104s corresponding to the plane region 10. In this embodiment, the material of the insulating layer 104 may include silicon nitride ($SiN_x$), silicon oxide ($SiO_x$), silicon oxynitride ($SiN_xO_y$), organic polymer, other applicable insulating materials, or a combination thereof. In some embodiments, the metallization structures under the insulating layer 104 include wires or bonding pads, and the metallization structure is configured to electrically connect to the outer circuits or other structures which are formed in the subsequent processes. The material of metallization structure (such as scan line and date line) may include copper (Cu), aluminum (Al), silver (Ag), molybdenum (Mo), chromium (Cr), titanium (Ti), other applicable metal materials, or a combination thereof.

Referring to FIG. 3B, a first electrode layer 105 is formed on the insulating layer 104, such that the first electrode layer 105 completely covers the planar surface 104s of the insulating layer 104. In one embodiment, a transparent conductive material is used to form the first electrode layer 105, and the transparent conductive material may include indium tin oxide (ITO), indium zinc oxide (IZO), cadmium tin oxide (CTO), aluminum zinc oxide, (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), other applicable transparent conductive materials, or a combination thereof.

Referring to FIG. 3C, a first photoresist layer 112 is formed on the first electrode layer 105. In this embodiment, the first photoresist layer 112 includes positive photoresist. In another embodiment, the first photoresist layer 112 may include negative photoresist.

Referring to FIG. 3D, a photolithography process is performed to pattern the first photoresist layer 112. Then, a first patterning process is performed to pattern the first electrode layer 105 by using the patterned first photoresist layer 112 as a mask. Portions of the electrode layer 105 are removed to expose portions of the insulating layer 104, so that the pixel electrodes (i.e., the electrode pattern 106 mentioned above) corresponding to pixel structures are defined. Only one electrode pattern 106 is shown in the figures for illustration purposes.

Referring to FIG. 3E, the patterned first photoresist layer 112 is removed to expose the electrode pattern 106. As mentioned above, since the insulating layer 104 includes the plane region 10 and the planar surface 104s corresponding to the plane region 10, the electrode pattern 106 corresponding to the plane region 10 also includes a planar surface. As mentioned above, the term "planar surface" means substantially planar, in other words, it means a non-patterned surface despite the fact that the surface roughness during the formation of the film and the topography of the underlying layers may be present.

Referring to FIG. 3F, a second photoresist layer 114 is formed on the electrode pattern 106 and the insulating layer 104. In this embodiment, the material of the second photoresist layer 114 may be the same as or similar to the positive photoresist of the first photoresist layer 112.

Referring to FIG. 3G, a photolithography process is performed to pattern the second photoresist layer 114. Then, a second patterning process is performed to pattern the electrode pattern 106 by using the patterned second photoresist layer 114 as a mask. Portions of the electrode pattern 106 are removed. The parameters of the etching step are adjusted so as not to etch through the electrode pattern 106, and thus the underlying insulating layer 104 will not be exposed. As shown in FIG. 3G, after the second patterning process, the electrode pattern 106 is formed with a patterned electrode structure having two portions corresponding to the plane region 10, and the two portions of the patterned electrode structure include the bottom layer 106a and the separated protrusions 106b disposed on the bottom layer 106a. The pattern of the protrusions 106b is utilized to produce a predetermined electric field direction during the pre-tilt angle alignment of the liquid-crystal molecules.

Referring to FIG. 3H, the patterned second photoresist layer 114 is removed, so that the electrode pattern 106 and the insulating layer 104 are exposed. In this embodiment, the bottom layer 106a and the protrusions 106b form a regularly arranged textured structure.

It should be noted that the bottom layer 106a and the protrusions 106b of the electrode pattern 106 are respectively formed by two patterning processes using the first photoresist layer 112 and the second photoresist layer 114, in this embodiment. However, in another embodiment, a single patterning process may be performed by using a halftone mask. As a result, photoresist layers of different thickness can be formed, to produce different etching depths in the same etched layer (such as the electrode pattern 106) in the subsequent etching process. Therefore, if a halftone mask is used, the bottom layer 106a and the protrusions 106b can be formed simultaneously in a single patterning process to simplify the fabrication processes.

Figure 5:
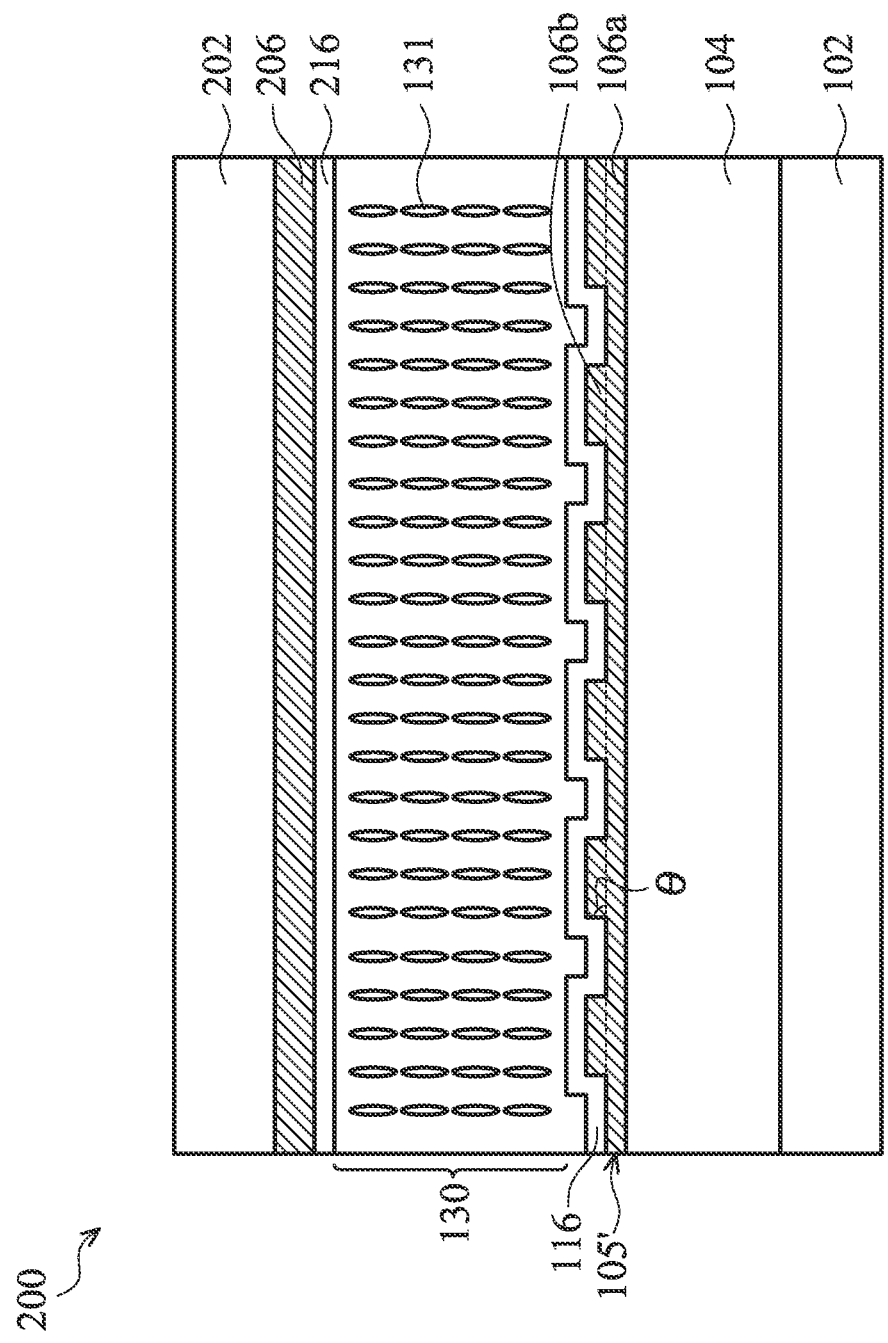
FIG. 5 shows a cross-sectional view of a liquid-crystal display device in accordance with one embodiment.

FIG. 5 shows a cross-sectional view of a liquid-crystal display device 200 in accordance with one embodiment. The same reference numerals will be used to designate the same or similar elements and the descriptions thereof will be omitted.

Referring to FIG. 5, the liquid-crystal display device 200, for example, a PSVA (polymer-stabilized vertical alignment) type liquid-crystal display device includes a first substrate 102, a second substrate 202, a insulating layer 104, a first electrode layer 105', a second electrode layer 206, a liquid-crystal layer 130, a first alignment layer 116, and a second alignment layer 216. It should be understood that the liquid-crystal display device 200 includes the pixel structures which are defined by the data lines and the scan lines. In other words, the insulating layer 104 includes the arrays of the plane regions, and each plane region in the insulating layer 104 corresponds to one pixel structure. For the sake of clarity, only a portion of one plane region 10 in the insulating layer 104 is shown.

The first substrate 102 and the second substrate 202 are disposed oppositely. In one embodiment, the first substrate 102 may be a thin film transistor substrate, and the second substrate 202 may be a color filter substrate. It should be noted that the first substrate 102 and the second substrate 202 are respectively made of transparent material in order to prevent the brightness loss of the liquid-crystal display device 200. The material of the first substrate 102 has been described above and will not be repeated. In some embodiments, the first substrate 102 and the second substrate 202 may include the same material. In other embodiments, the first substrate 102 and the second substrate 202 may include different materials.

Then, the insulating layer 104, the first electrode layer 105', and the first alignment layer 116 are formed on the first substrate 102, and the second electrode layer 206 and the second alignment layer 216 are sequentially formed on the second substrate 202. Pixel control structures (not shown), such as transistors, scan lines, and data lines, may be formed under the insulating layer 104 on the first substrate 102.

The material of the first electrode layer 105' has been described above and will not be repeated. In some embodiments, the first electrode layer 105' and the second electrode layer 206 may be made of the same material. In other embodiments, the first electrode layer 105' and the second electrode layer 206 may be made of different materials. In this embodiment, it should be noted that after forming the first electrode layer 105' on the insulating layer 104, the electrode pattern 106 including the bottom layer 106a and the protrusions 106b may be formed by a single patterning process (using a halftone mask) or two patterning processes. However, after forming the second electrode layer 206, no patterning processes are performed on the second electrode layer 206. Therefore, the second electrode layer 206 is a planar and non-patterned electrode layer. In other embodiments, an additional patterning process may optionally be performed on the second electrode layer 206, such that the second electrode layer 206 may have a predetermined pattern.

In other embodiments, a patterning process that is similar to the patterning process of the electrode pattern 106 may be performed on the second electrode layer 206, such that the second electrode layer 206 may have a similar bottom layer and protrusions. In such an embodiment, it should be noted that the electrode pattern 106 is a planar layer without the bottom layer 106a and protrusions 106b.

The electrode pattern 106 of FIG. 5 has the same structure as the electrode pattern 106 of FIG. 3. The structure of the electrode pattern 106 is as shown in FIG. 4 and the details will not be repeated here.

In one embodiment, polyimide (PI) is coated on the first electrode layer 105' and the second electrode layer 206 by a printing process, such as an anilox print roller coating (APR coating), to respectively form the first alignment layer 116 and the second alignment layer 216. In other embodiments, the first alignment layer 116 and the second alignment layer 216 may be formed by any other processes and materials.

Then, the first substrate 102 and the second substrate 202 are disposed oppositely. A liquid-crystal composition is injected into the space between first substrate 102 and the second substrate 202, such that a liquid-crystal layer 130 is disposed between the first electrode layer 105' and the second electrode layer 206. The liquid-crystal layer 130 includes liquid-crystal molecules 131 and reactive monomer molecules (not shown).

The liquid-crystal molecules 131 may include negative liquid-crystal molecules and positive liquid-crystal molecules. The negative liquid-crystal molecules have a long axis direction parallel to the electric field direction, and the positive liquid-crystal molecules have a long axis direction perpendicular to the electric field direction. In one embodiment, the liquid-crystal molecules 131 are negative liquid-crystal molecules. It should be noted that the liquid-crystal molecules 131 are not limited to negative liquid-crystal molecules, and all liquid-crystal molecules which can produce a liquid-crystal phase are within the scope of the disclosure.

The reactive monomer molecules may be the monomers with polymerizable functional groups. The polymerizable functional groups may include acrylate, methacrylate, vinyl group, butadiene, vinyl ether, epoxy group, or a combination thereof.

Then, a curing process of the reactive monomer molecules is performed, such that a first polymer stabilization layer is formed between the first alignment layer 116 and the liquid-crystal layer 130, and a second polymer stabilization layer is formed between the second alignment layer 216 and the liquid-crystal layer 130 (not shown).

Firstly, voltages with different electrical polarities are respectively applied to the first electrode layer 105' and the second electrode layer 206, such that a vertical electric field with the electric field direction perpendicular to the planar surface of the first electrode layer 105' is produced. The liquid-crystal molecules 131 will tilt toward a predetermined direction along a predetermined pre-tilt angle due to the force of the electric field and the anchoring force of the alignment layers.

After the liquid-crystal molecules 131 tilt, the curing process of the reactive monomer molecules is performed. The curing process may include photo-curing or thermal-curing. By providing thermal energy or light with a predetermined energy, the reactive monomer molecules are polymerized and affixed or immobilized onto the surfaces of the first alignment layer 116 and the second alignment layer 216, and the resulting polymer enables the liquid-crystal molecules 131 to be arranged along the predetermined pre-tilt angle. As a result, a first polymer stabilization layer and a second polymer stabilization layer are formed on the surfaces of the first alignment layer 116 and the second alignment layer 216, respectively.

The liquid-crystal display device 200 includes the aforementioned electrode pattern 106 of the patterned first electrode layer 105' in accordance with this embodiment. The electrode pattern 106 includes the bottom layer 106a and the separated protrusions 106b. As a result, the vertical electric field vector with appropriate strength and the horizontal electric field vector with appropriate strength are produced. Therefore, for the liquid-crystal display device 200 of this embodiment, the reaction time can be reduced, the brightness can be enhanced, and the direction of arrangement of the liquid-crystal molecules can be effectively controlled.

In conventional polymer-stabilized vertical alignment techniques, before forming the transparent conductive layer, the insulating layer may be etched to form a plurality of trenches on its surface, and then the transparent electrode layer may be conformally deposited on the insulating layer. However, in order to avoid the occurrence of electrical failure caused by disconnection of the subsequent transparent electrode layer deposited within the trench, the included angle between sidewalls of the trench and the bottom of the trench cannot be made close to 90 degrees, and a ramp sidewall is generally formed instead. As such, when the subsequent alignment layer is formed on the transparent electrode layer, the included angle of the alignment layer between sidewalls of the trench and the bottom of the trench cannot be close to 90 degrees. In a dark state without voltage applied, since the liquid-crystal molecules are arranged perpendicular to the alignment layer surface, the liquid-crystal molecules located above the ramp sidewall will be arranged along an inclination angle, rather than perpendicular to the surface of the substrate. Therefore, the ramp sidewall will lead to light leakage in the dark state and cause a decrease in contrast.

Furthermore, when the insulating layer is etched, the depth of the trenches has to be greater than 200-250 nm in order to produce the vertical electric field vector with appropriate strength and the horizontal electric field vector with appropriate strength. However, if the trenches are too deep, it will result in poor planarity of the subsequent alignment layer, and decrease the display contrast.

The disclosure provides the electrode pattern 106 including the bottom layer 106a and the separated protrusions 106b. Comparing to the techniques which use the patterned insulating layer, the electrode pattern 106 has the following advantages:

(1) Since the electrode pattern 106 may include the bottom layer 106a, no discontinuous electrode pattern 106 will be formed, and therefore the problem of electrical failure can be avoided.

(2) Since the sidewalls 107 of the protrusions 106b and the top surfaces 109 of the bottom layer 106a may have an included angle θ of approximately 90 degrees, the problems of light leakage in the dark state and the decrease in contrast can be mitigated or eliminated.

(3) When the protrusions 106b have a height H in a range of 50-150 nm, the electrode pattern 106 can produce the horizontal electric field vector with appropriate strength and the horizontal electric field vector with appropriate strength. Therefore, the higher planarity of the subsequent alignment layer will be obtained, and the display contrast will be improved.

As mentioned previously, the patterned transparent electrode layer of this disclosure can solve the problems of electrical failure, light leakage in the dark state, and the decrease in contrast, and therefore the performance of the liquid-crystal display can be improved.

Although the disclosure has been described by way of example and in terms of the preferred embodiments, it should be understood that various modifications and similar arrangements (as would be apparent to those skilled in the art) can be made herein without departing from the spirit and scope of the disclosure as defined by the appended claims.

What is claimed is:

1. A pixel structure, comprising:
   a substrate;
   an insulating layer on the substrate and comprising a plane region; and
   an electrode pattern disposed on the insulating layer and located on the plane region, wherein the electrode pattern comprises a bottom layer and a plurality of protrusions connected to the bottom layer, wherein the plurality of protrusions protrude from a top surface of the bottom layer towards a direction away from the substrate, and wherein a height of the plurality of protrusions is in a range of 50-150 nm, wherein the bottom layer covers the plane region and a plurality of slits are formed between the protrusions so as to expose portions of the bottom layer.

2. The pixel structure as claimed in claim 1, wherein one of the protrusions has a sidewall, and wherein an included angle between the sidewall and the top surface is in a range from 60 to 90 degrees.

3. The pixel structure as claimed in claim 1, wherein the bottom layer of the electrode pattern is a layer with a substantially uniform thickness, and wherein the plane region has a substantially planar surface.

4. A liquid-crystal display, comprising:
a first substrate;
a second substrate disposed opposite to the first substrate;
an insulating layer on the first substrate and comprising a plurality of plane regions arranged as an array;
a first electrode layer on the insulating layer and comprising a plurality of electrode patterns, wherein the plurality of electrode patterns are respectively disposed in the plurality of plane regions, wherein each one of the plurality of electrode patterns comprises a bottom layer and a plurality of protrusions on the bottom layer, wherein the plurality of protrusions protrude from the bottom layer towards a direction away from the substrate, wherein a height of the plurality of protrusions is in a range of 50-150 nm, and wherein the bottom layer covers the plane region and a plurality of slits are formed between the protrusions so as to expose portions of the bottom layer on one of the plurality of plane regions;
a second electrode layer on the second substrate; and
a liquid-crystal layer between the first electrode layer and the second electrode layer.

5. The liquid-crystal display as claimed in claim 4, further comprising a plurality of scan lines and a plurality of data lines crossing to each other to form a plurality of pixel structures, wherein the plurality of plane regions correspond to the plurality of pixel structures.

6. The liquid-crystal display as claimed in claim 4, wherein each of the protrusions has a sidewall, and wherein an included angle between the sidewall and a top surface is in a range from 60 to 90 degrees.

7. The liquid-crystal display as claimed in claim 4, wherein the bottom layer of each of the electrode patterns is a layer with a substantially uniform thickness, and wherein each of the plane regions has a substantially planar surface.

8. The liquid-crystal display as claimed in claim 4, further comprising:
a first alignment layer between the first electrode layer and the liquid-crystal layer; and
a second alignment layer between the second electrode layer and the liquid-crystal layer.

* * * * *